Aug. 11, 1953
V. WILSON
2,648,430
EGG CANDLING AND GRADING APPARATUS
Filed Oct. 23, 1947
4 Sheets-Sheet 1
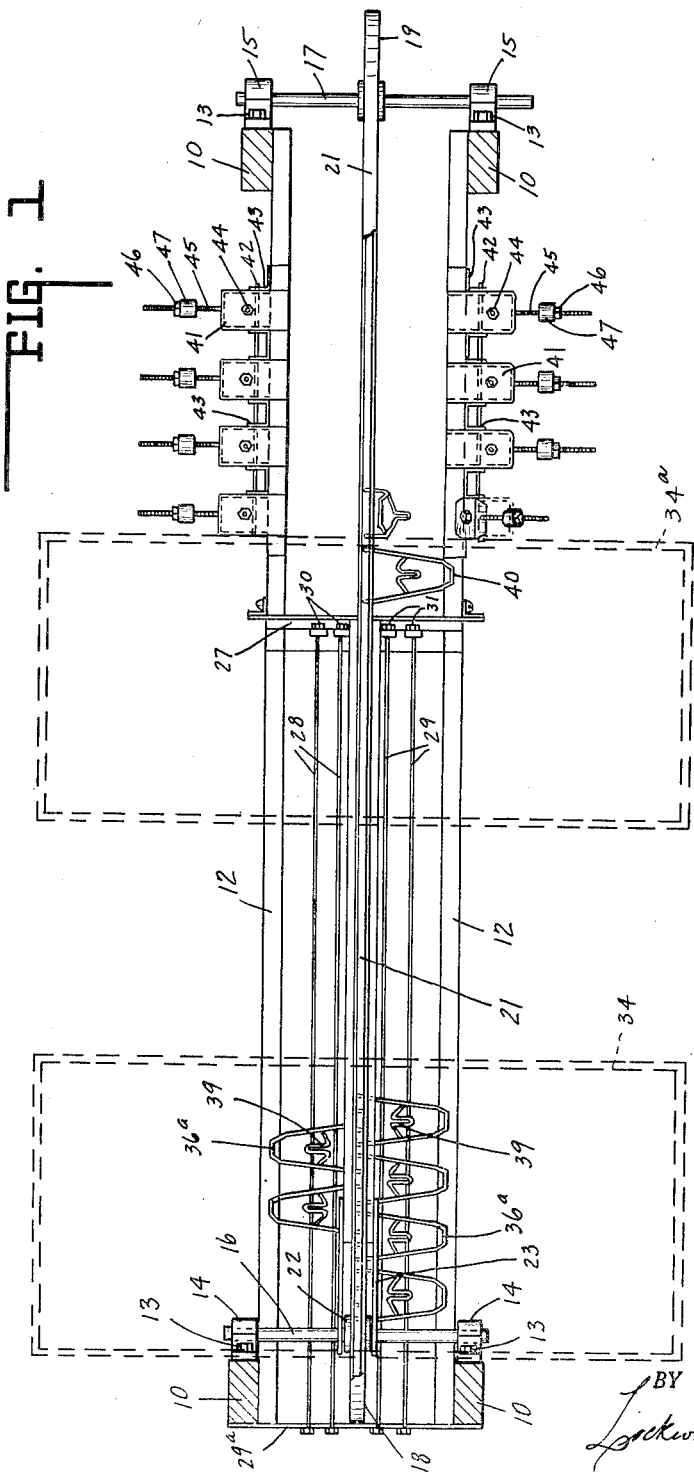
INVENTOR.
VAN WILSON,
BY
Lockwood, Goldsmith & Galt
ATTORNEYS.

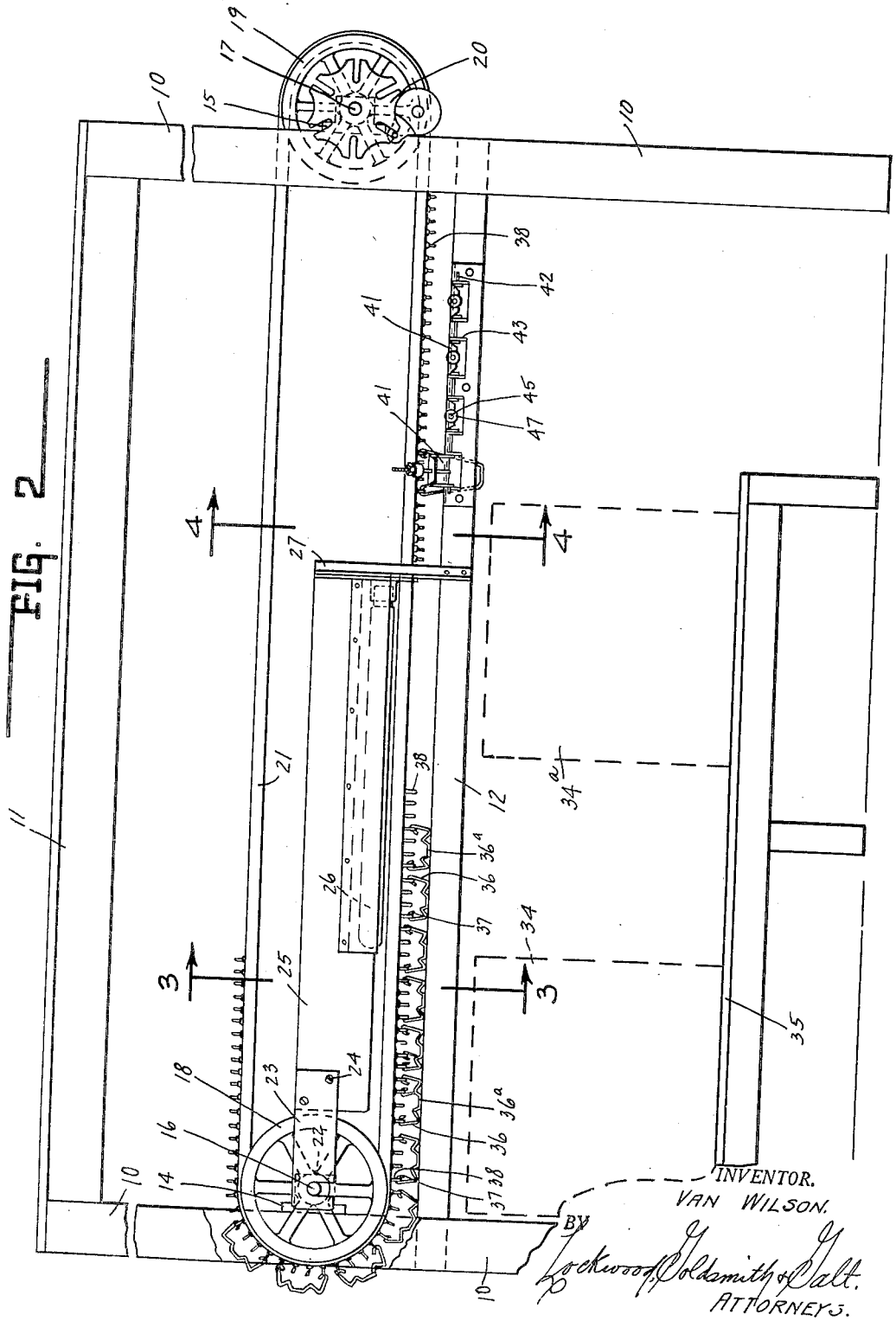

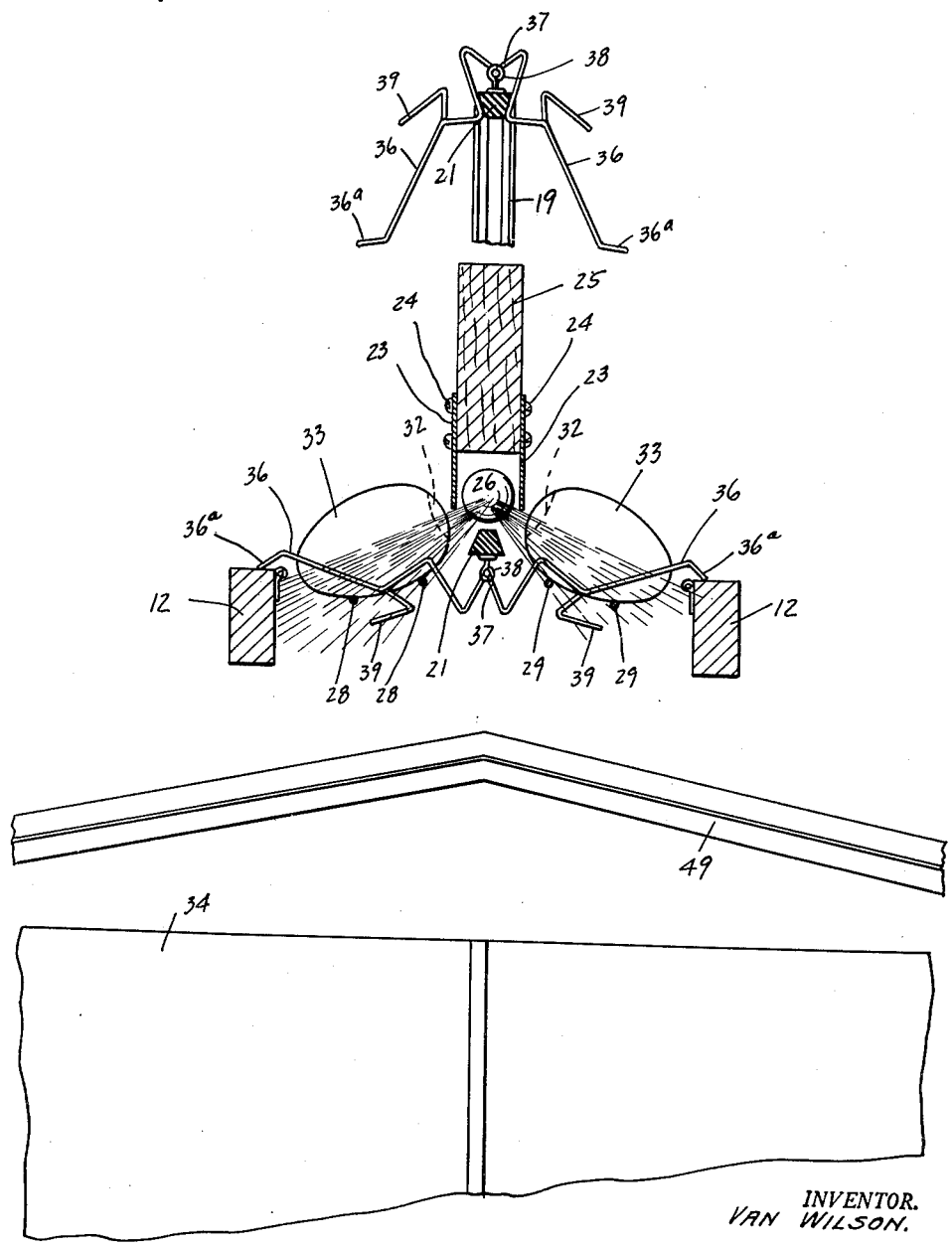

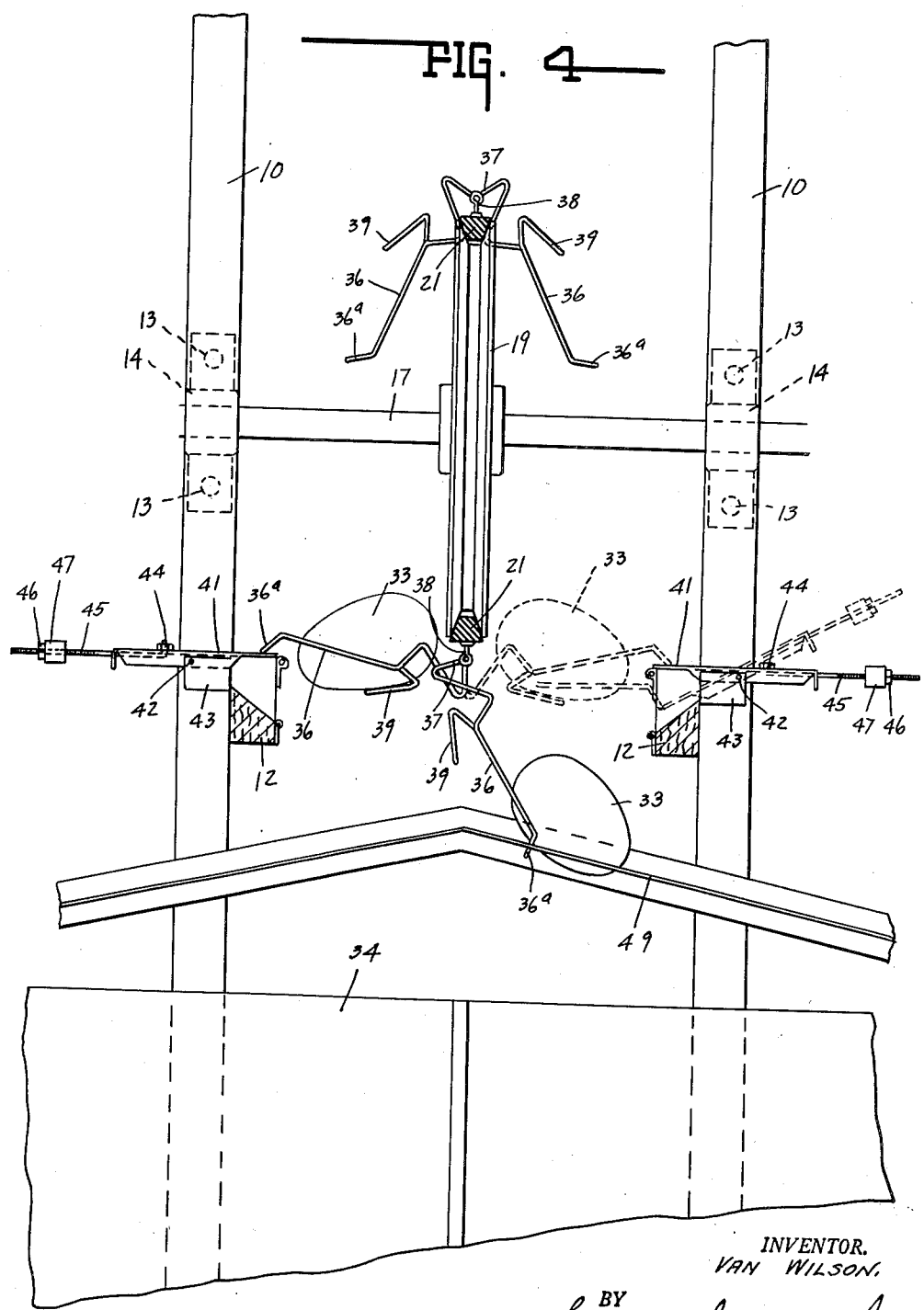

Patented Aug. 11, 1953

2,648,430

UNITED STATES PATENT OFFICE 2,648,430

EGG CANDLING AND GRADING APPARATUS

Van Wilson, Lebanon, Ind.

Application October 23, 1947, Serial No. 781,647

10 Claims. (Cl. 209—71)

This invention relates to an egg candling apparatus in combination with an automatic egg grading or sizing mechanism.

It is commonly known that the inspection or candling of country run eggs is an art in itself. The reason eggs are candled or inspected, is of course to separate any off-grade from the quality eggs. An egg may be a so called "off-grade" egg because it is cracked, rotten, dirty, checked, or because it has miscellaneous spots including blood spots. It is, of course, the responsibility of the egg candler or inspector to check the eggs and determine their quality.

The traditional method of candling eggs, has, for many years, been the laborious and time-consuming method of placing each egg in front of a suitable light and visually inspecting the egg.

It is the primary object of this invention to provide an egg candling apparatus which will make it possible for the egg inspector to visually inspect several eggs at approximately the same time and thereby to facilitate and increase the speed in which the candling is done.

While the conventional method of candling eggs may easily take two people an hour to inspect four cases containing thirty dozen of eggs per case, it is easy, with the present invention for the same two persons to candle from eight to ten cases of eggs in that time.

It is a further object of this invention to provide an egg candling mechanism which will automatically turn the eggs several times during the period of their inspection. This is highly desirable for the following reasons: any cracks or blood spots will be readily observed; the mobility of the yolk is a characteristic of significance in determining the quality of the egg. By providing for a turning or rotation of the eggs, this characteristic can readily be visualized. In this connection, it might be explained why the mobility of the yolk is of significance. The albuminous or white portion of a fresh or high quality egg is relatively thick. This factor serves to protect the yolk of the egg from the deterioration which results from the absorption through the shell of air and heat, it being borne in mind that it is the yolk of the egg that actually spoils or becomes rotten. With age, however, the albuminous portion tends to reduce in size and thickness and its protective influence is concurrently reduced. Since the yolk does not increase in size, its mobility will be increased in direct proportion to the decrease in thickness of the white portion. Thus, in inspecting eggs, an efficient candler will be able to determine the age of the egg within limits of course, from the mobility and freedom of movement of its yolk. It is, therefore, desirable that the egg be rotated or turned during the inspection period in order that the candler may observe this mobility.

It is a still further object of this invention to provide an apparatus which will keep the egg continuously in the proper egg candling position during the inspection period. This is highly important in connection particularly with observing the air pockets in the egg. These air pockets are always present in the large end of the egg and are approximately of the circumference of a United States dime, in a fresh, high quality egg. It is well known that the air space increases with age and this is an additional factor which the candler considers in determining the quality and freshness of the egg. In order to be better able to observe the air pocket, it is important that the egg be tilted at an angle and retained at this same angle as the egg is turned. This invention accomplishes that object.

It is a still further object of this invention to provide an egg carrier or retainer which will hold, carry, and retain any and all sizes of country run hen eggs, thereby making it unnecessary for the candler to apportion the extra large eggs to certain carriers and the small eggs to other carriers.

It is a still further object of this invention to provide an egg carrier which not only will effectively carry all sizes of eggs, but at the same time will also enable broken eggs to drop therethrough without discoloring the carrier and leaving it in a condition such that the eggs subsequently carried will be discolored and made dirty.

It is a still further object of this invention to provide means associated with the egg carrying apparatus in such a manner that the egg carrying apparatus will momentarily stop at timed intervals in order to provide adequate time for a proper egg inspection and in order to make it easier for the candler to place the eggs to be inspected, in the egg carriers.

It is a still further object of this invention to provide a light bulb structure of such a nature that the beam of light, which makes the candling process possible, will be projected only towards the lower half of the egg. By the use of this structure, the candler is assured of attaining the maximum amount of light from his bulb and at the same time eliminates any extraneous rays of light which might strike the upper half of the egg or which might create a glare which would impede the effectiveness of the candling.

It is a still further object of this invention to provide a series of scales for weighing the eggs immediately following the candling step. In this connection, it should be stated that it is now customary to grade eggs by their size and weight. The price commanded by the eggs is directly proportioned to their weight. Generally speaking, eggs are graded for sale in one of four classifications, to-wit: extra large, large, medium, and small. The extra large eggs usually have a minimum net weight per dozen of 26 ounces; the large, a minimum net weight of 24 ounces per dozen; the medium, 21 ounces per dozen, and the small are eggs which weigh less than 21 ounces per dozen. It is thus readily apparent that the grading of eggs is a necessary step, and provision for it is therefore made in this invention.

The full nature of the invention will be understood from the accompanying drawings and the following description and claims:

Fig. 1 is a plan view of the invention with parts of the upper frame removed.

Fig. 2 is a side elevation view with parts broken away and omitted.

Fig. 3 is a vertical sectional view taken on line 3—3 of Fig. 2 in the direction of the arrows.

Fig. 4 is a vertical sectional view taken on line 4—4 of Fig. 2 in the direction of the arrows.

In the drawings 10 indicates the upright members or legs of the frame which supports the egg candling apparatus. The uppermost surfaces of said upright members 10 are connected by the cross member or shelf 11. Disposed intermediate the upper and lower ends of said uprights 10 and connected thereto are the cross members or runways 12. Suitably secured by bolts 13 to each of said uprights 10 at a point somewhat above the cross members 12 are the bearings 14 and 15. The bearings 14 are secured as shown in Fig. 1 to the inner face of said upright members 10 while the bearings 15 are secured to the outer face of the oppositely disposed upright members 10. Pivotally mounted in said bearings 14 and 15 are the shafts 16 and 17. Suitably mounted upon said shafts 16 and 17 intermediate their respective ends are the V-grooved pulleys 18 and 19. Associated with said V-grooved pulley 19 is a Geneva drive 20 for a purpose hereinafter described in detail. This drive 20 is connected to a source of electric power, not shown. Connecting the V-groove pulleys 18 and 19, respectively, is a V-belt 21 which is driven by the rotation of said pulleys which in turn are driven by said Geneva drive 20.

Mounted on the said shaft 16 on either side of the hub 22 of the pulley 18 is the light bulb supporting frame 23. Secured by bolts 24 to said light bulb frame 23 is the housing 25 for the light bulb 26. The housing 25 is mounted at its opposite end on the inverted U-shaped angle iron 27 which in turn is secured to the cross members 12.

The conventional egg candling methods heretofore used have employed a light bulb directly underneath the eggs. The present invention features a bulb of considerable length which is so housed within the housing 25 that its rays project towards the lower half only of the eggs, thereby making it easier to observe the mobility of the yolk, the air pocket, and any blood spots.

Disposed intermediate said cross members or runways 12 are two pairs of wire members 28 and 29, respectively. Each pair of said wire members is secured at one end to a cross bar 29a which is disposed transversely of said frame uprights 10 and is suitably secured thereto. The opposite ends of said wire members are suitably supported, with bolts 30 and 31, on a transverse support connected to the runways 12 and lying below the path of the egg carriers 36. The inner one of each pair of wires is so positioned that it is on the same plane as the upper surface of the cross members or runways 12. The outer one of each pair of wire members is so mounted that it is on a somewhat lower plane than the inner wire of the pair. Each pair of wire members thus disposed serves to tilt the egg in the desired manner as shown particularly in Fig. 3 so that the air pocket 32 in the egg 33 may better be viewed.

The operator of the candling apparatus places the crate of eggs 34 upon a suitable independent platform 35 immediately under the cross members or runways 12. The eggs are thus in a position where they are ready to be picked up by the operators and placed in the egg carriers 36. These egg carriers are so designed that they retain any and all sizes of eggs whether jumbo size or very small. The carriers are substantially U-shaped as shown, with their free ends 37 being curled or looped in order to enable them to be secured to the screw eyes 38 which are attached at spaced intervals on said V-belt 21. The base of said substantially U-shaped carrier members 36 is turned downwardly or flared as shown at 36a. Intermediately disposed between said flared portions 36a and said looped or curled portions 37 of said egg carriers is a cross member 39 having a return bend portion for resiliency and egg rest purposes. The looped portions 37 of the egg carriers 36 are secured to said screw eyes 38 in such a manner that a plurality of carriers is disposed outwardly in one direction from said V-belt 21 and a plurality of said carriers is disposed outwardly in the other direction from said V-belt 21. The free ends of said oppositely disposed plurality of egg carriers are secured to said screw eyes in a staggered relation one to the other so that the adjacent arms of any two carriers positioned on one side of the V-belt are located intermediate the arms of one of the plurality of egg carriers positioned on the opposite side of said V-belt. This arrangement is shown best in Fig. 1.

The flanged portion 36a of each of the egg carriers is adapted to ride along the upper face of the cross members or runways 12. Each pair of wire members 28 and 29, respectively, is so positioned with respect to the egg carriers that the bottom portion of the eggs 33 come into engagement therewith as shown in Fig. 3. By reason of the fact that the two members of each pair of wire members are on a different plane one from the other, the eggs are tilted at an angle as aforesaid in order to permit the air pocket 32 to be viewed by the operator of the candling device with greater facility. The small graded eggs are placed in the carrier 36 the transversely disposed wire cross member 39 serves to retain the egg and to keep it from falling from the carrier member at the time when the carrier member has passed beyond the wire members and is in the position of the carrier member 40.

Disposed at an end of the runways 12 opposite to the end where are located said wire members are the weighing and grading tip scales 41. These tip scales are pivotally mounted at 42 upon a member 43 which is secured to said runways 12. Suitably secured by the nuts 44 to the tip scales is a threaded shaft 45 upon the outer end of which is threadedly mounted a nut 46. Also mounted upon said shaft interiorly of said nut 46 is a weight 47 which can be adjusted in such a way that the tip scales will be responsive to a desired weight thereon.

The egg candling apparatus is so arranged as aforesaid that one person is able to work on one side of the frame structure supporting the apparatus and another person is able to work at the same time on the other side thereof. Each operator will be concerned with picking up eggs from the egg crate 34 which is placed upon the independent platform 35 which is placed immediately underneath the egg candling apparatus, and with placing the eggs to be candled within the egg carriers. Thus, one series of egg carriers will be filled by one operator while the oppositely disposed series will be filled by the other operator.

The Geneva drive is adapted to turn the V-grooved pulley 19 at fixed intervals in such a manner that the pulley 19 will be turned for approximately one-third of a second out of every one and one-third seconds, and will come to a halt the remaining one second of every one and one-third second period. When as a result of this Geneva drive the belt 21 comes to a pause, the operator in the one second interval is able to place approximately three eggs in the egg carriers with one hand. The V-belt will carry the eggs in a direction toward the light bulb 26. As the egg carriers with the eggs positioned thereon come adjacent to the light bulb, the rays of light being emitted thereby strike the lower half of each egg. The use of the Geneva drive is of great importance when the egg is within the beam of light, for the egg comes to a stop a sufficient time to enable the egg yolk to come to the surface where the egg candler can observe its condition and quality. It has been found preferable to use a lamp bulb of approximately eighteen inches in length so that any one egg is capable of being candled for a period of several seconds.

As heretofore mentioned, one of the methods by which an egg candler is able to determine the quality and condition of an egg is by observing the mobility of the yolk. With the arrangement above described each egg during the course of its movement through the lighted space from one end of said light bulb to the other will be turned over completely between eight and nine times thereby affording the operator of the candling device full opportunity of noting and observing this mobility of the yolk.

When the egg carriers are conveyed by the V-belt to a point beyond the wire members they come into contact successively with the aforementioned four egg weighers or scales 41. Each of the scales 41 is adjusted by the candling operator so that it will be tipped at the times that eggs of a certain weight rest thereupon. The Geneva movement gears are so adjusted that the V-belt 21 causes each carrier to pause immediately above and on one of the egg scales 41. It is necessary, of course, to adjust the scales so that the ones with which the carriers first come into contact will bear the greatest weight. The weight which each of the following egg scales will bear without tipping is progressively reduced.

For example, the first egg weigher is adjusted so that the extra large eggs alone will tip the scales. The second egg weigher is so adjusted that it will tip only when the so called large eggs rest thereupon in their carrier; the third weigher or scales is so adjusted that it will tip only when a medium egg rests thereupon in the carrier, and the last scales are by the same token adjusted so that they are responsive to and will be tripped by the weight of the so-called small eggs.

Once the scales are tripped by the weight of an egg in its carrier, as shown in Fig. 4, the carrier will drop downwardly and the egg resting thereon will be rolled outwardly from it on to a trough or inclined ramp 49 which runs transversely of said egg candling apparatus. The egg will then roll down the ramp to a point where the operator of the candling apparatus can pick it up and place it in its proper crate for shipping purposes.

After the egg carriers 36 have discharged their eggs they are carried by the V-belt 21 in a downwardly extending position such as that shown in Fig. 4. They are carried in this position up around and over the V-groove pulley 19 and are transported thereby the entire length of the egg candling apparatus around the pulley 18 disposed at the opposite end of the apparatus and down into position where they once again engage the runways or cross members 12 and are brought to a horizontal position in readiness to receive eggs.

On occasion an egg candler finds that an egg, for unavoidable reasons, breaks while it is in the process of being candled. The egg carriers 36 are so designed and formed that the yolk and albuminous portion of the broken eggs will drop therethrough leaving a minimum residue with which subsequent eggs placed on the carrier will come in contact. A suitable pan or the like may be provided immediately under the length of one end of the apparatus to catch the yolk and albuminous portion of such eggs as are broken. In addition, there is provided at 34a a crate in which any off-grade eggs may be placed.

While the invention has been illustrated and described in great detail in the drawings and foregoing description, the same is to be considered as illustrative and not restrictive in character.

The invention claimed is:

1. In an egg handling apparatus, a conveyor element movable longitudinally of itself, a longitudinal support spaced from said conveyor element, a plurality of egg conveying elements pivotally supported on said conveyor element on longitudinal axes and supported by said support against pivotal movement from egg-conveying position, said egg-conveying elements comprising an elevated guiding frame and a depending central egg support, a pair of longitudinal rails disposed beneath said guiding frames along a portion of the path of said egg-conveying elements in position to support eggs within said frames and elevated above the depending egg supports, said frames being positioned to roll eggs along said track over said path-portion, said conveyer egg supports being moved to receive the eggs from the track whereby such eggs are subsequently supported wholly by said egg-conveying elements in positions therein predetermined by the positions of the eggs on said rails.

2. In egg handling apparatus, a longitudinally movable conveyer, a pair of spaced longitudinal rails adjacent said conveyer forming an egg-supporting track along which eggs may freely roll, egg guides movable with the conveyer and comprising opposed egg-guiding members adapted respectively to lie in front of and behind an associated egg normally disposed transversely on the track, said members being spaced to permit limited free movement of the egg along the track between said members and being formed to guide a normally positioned egg in straight-rolling movement along the track, and means to move said conveyer intermittently.

3. In egg handling apparatus, a longitudinally movable conveyer, a pair of spaced longitudinal rails adjacent said conveyer forming an egg supporting track of a character along which eggs may freely roll, one of said rails being higher than the other whereby an egg positioned normally thereon transverse to the rails lies with its axis inclined, egg conveying elements movable with the conveyer and comprising transverse opposed egg-guiding members adapted to loosely embrace an egg lying on said track between such members, said members being divergent from the lower end toward the upper end of an egg normally positioned on the track whereby their reaction on an egg tends to maintain it in straight rolling normal position on said track.

4. In egg handling apparatus as defined in claim 3, in combination with means to move said conveyer intermittently to cause abrupt engagements between said egg-guiding members and an associated egg.

5. An egg candling apparatus, comprising a pair of narrow longitudinal rails adapted to support eggs in rolling engagement therewith, one of said rails being higher than the other whereby eggs normally positioned thereon lie transversely thereof in an inclined position, a conveyer element parallel with said rails, egg guides carried by said conveyer element and having egg-engaging portions positioned to engage normally positioned eggs to roll them along said rails, a light source positioned to cast its direct rays substantially axially of eggs normally positioned on the rails and toward the upper ends of such eggs, and means to shield substantially the upper halves of such eggs from said light source.

6. An egg candling apparatus, comprising a pair of narrow longitudinal rails adapted to support eggs in rolling engagement therewith, one of said rails being higher than the other whereby eggs normally positioned transversely thereon lie in an inclined position, a conveyer element parallel with said rails, means to move said conveyer element intermittently forward and to hold it in rest position between its intermittent forward movements, egg guides carried by said conveyer element and having egg-confining portions to loosely embrace an egg supported on said rails whereby such egg is alternately rolled forward on said rails and stopped thereon, a light source positioned to cast direct rays transversely across and above said rails from above the upper rail, a shield interposed between said light source and the path of eggs along said rails and disposed to shield from said light source substantially the upper halves of eggs on said rails.

7. An egg candling apparatus, comprising a pair of longitudinal egg supporting rails one of which is higher than the other whereby eggs normally positioned transverse thereof lie with their long axes inclined, a longitudinally movable conveyer element along the side of said pair of rails, generally U-shaped egg-confining frames carried by said conveyer and extending laterally therefrom across the rails to guide and move eggs therealong, a light source positioned to cast direct rays transversely across and above said rails from above the upper rail, and into the open ends of said U-shaped frames, a shield interposed between said light source and the path of eggs along said rails and disposed to shield from said light source substantially the upper halves of eggs on said rails.

8. In egg handling apparatus, a longitudinally-movable conveyer, a pair of rails forming a track to receive eggs in rolling engagement, egg guides pivotally mounted on the conveyer on longitudinal axes and having egg engaging arms which in egg-guiding normal position extend transversely above the track to propel eggs therealong, egg supports associated with said guides and disposed to move with said egg guides in a non-supporting position between said rails, said guides and supports moving beyond said track and receiving eggs in predetermined supporting position from the track, and scale mechanism at a subsequent position along the path of the egg supports with which said pivoted conveyer egg supports cooperate and which reacts to the turning moment of said egg supports about the longitudinal pivot axis thereof.

9. In egg handling apparatus, a series of longitudinally movable egg carriers, a driven conveyer element extending along one longitudinal edge of said series and pivotally supporting the carriers thereof on longitudinal axes, a longitudinal support along the opposite edge of said series, an independent longitudinal support in the path of eggs in said carriers adapted to support said eggs independently thereof and to cooperate therewith in causing said eggs to assume uniform positions with respect to their carriers, said independent support extending over only a portion of the path of said carriers whereby eggs uniformly positioned thereby are received in uniform position in the carriers, and means selectively actuated by the carriers in response to the turning moment of said carriers about their longitudinal pivot axis to cause said carriers to pivot about their conveyer supported edges to egg discharging positions.

10. In egg handling apparatus, a conveyor element movable longitudinally of itself, egg-conveying units carried thereby and comprising an upper egg-guiding portion and a lower egg-supporting portion united therewith, and independent egg-supporting means operative during a portion of the travel of said egg-conveying units to support eggs in guided relationship with said egg-guiding portions and independent of said egg-supporting portions of the egg-conveying units.

VAN WILSON.

References Cited in the file of this patent
UNITED STATES PATENTS

| Number | Name | Date |
|---|---|---|
| 917,409 | Branch | Apr. 6, 1909 |
| 1,064,729 | Hickey | June 17, 1913 |
| 1,155,905 | Fish | Oct. 5, 1915 |
| 1,681,387 | Benzing | Aug. 21, 1928 |
| 1,699,935 | Warnes | Jan. 22, 1929 |
| 1,737,819 | Wetmore | Dec. 3, 1929 |
| 1,816,483 | Heaton | July 28, 1931 |
| 1,864,034 | Wyland | June 21, 1932 |
| 1,875,811 | Hilgers | Sept. 6, 1932 |
| 1,947,142 | Ward et al. | Feb. 13, 1934 |
| 2,016,789 | Neuhaus | Oct. 8, 1935 |
| 2,092,396 | Jennings | Sept. 7, 1937 |
| 2,093,338 | Niederer | Sept. 14, 1937 |
| 2,135,778 | Wyland | Nov. 8, 1938 |
| 2,166,706 | Schwarzkopf | July 18, 1938 |
| 2,175,262 | Haugh | Oct. 10, 1939 |
| 2,246,597 | Niederer | June 24, 1941 |
| 2,252,909 | Van Wyk | Aug. 19, 1941 |
| 2,308,729 | Walter | Jan. 19, 1943 |
| 2,488,230 | Page | Nov. 15, 1949 |